United States Patent Office 3,208,813
Patented Sept. 28, 1965

3,208,813
DYESTUFFS FOR SHAPED ARTICLES OF HIGH MOLECULAR POLYMERS AND THE METHOD OF DYEING THESE POLYMERS TO FAST YELLOW COLOR
Ryukichi Tanaka, Kazuhiro Teramura, and Seiichiro Yokoyama, Kyoto, Japan, assignors to Nitto Boseki Co., Ltd., Fukushima-shi, Japan, a corporation of Japan
No Drawing. Filed June 13, 1963, Ser. No. 287,498
Claims priority, application Japan, June 15, 1962, 37/24,359
9 Claims. (Cl. 8—4)

The invention relates to new and improved dyestuffs for dyeing shaped articles of hydrophobic synthetic organic high molecular polymers, especially polyolefins, polyvinylchloride, polyvinylidenechloride and polystyrene to fast yellow color, and also relates to an improved and simplified method of dyeing these polymers to fast yellow color.

When shaped articles of polyolefins like fiber or film of polyethylene or polypropylene are to be dyed, it is necessary to select from hydrophobic dyestuffs such ones as have great affinity and compatibility with these polymers. In other words, dyeing power and fastness of dyed substance are closely related with chemical structure of dyestuffs.

If conventional hydrophobic monoazo dyestuffs on the market in which the coupling components are pheno, cresol, phenylmethylpyrazolone or acetoacetic anilide, are employed for dyeing shaped articles of polyolefins, affinity of dyestuffs and fastness of dyed articles are extremely poor and we cannot expect articles of practical value.

The inventor of the present invention has synthetized many kinds of monoazo dyestuffs and investigated the relation of affinity and fastness to dyestuf structure. From the result of these investigations we have recognized that the dyestuffs which have alkylphenol derivatives for their coupling components and which are rich in fatty character can be adsorbed well by polyolefins and afford articles of deep color.

As examples of these yellow dyestuffs, we can select the following ones:

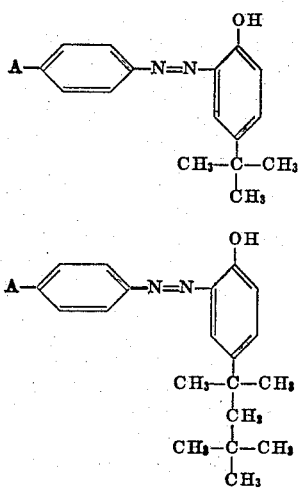

In the above formula A means hydrogen atom, halogen atom or alkyl radical.

Although the affinity and compatibility of these dyestuffs which have relatively aliphatic character are fairly strong and accordingly will dye articles to deep color, their fastness is not sufficient in other point. Namely shaped article of polyolefins dyed by these dyestuffs are seemingly useful from the point of fastness, resistance to sunlight, resistance to washing, abrasion resistance and sublimation resistance, but they are not perfect in the following point.

If dyed articles are, for example, packed in paper bag or polyethylene bag, dyestuffs have the tendency to come out of the dyed articles toward the bag material. As they are liable to move toward oily substance, dyed fabrics may soil the skin of the people.

In order to overcome the aforementioned defect the inventor has investigated the effect of radical substituted in aromatic neucleus of these dyestuffs, but we could not find single dystuff useful for polyolefin articles among those which have known substitution radical.

The object of this invention is to obtain monoazo dyestuffs which have not above-mentioned defect, and still dye shaped articles of polyolefins, polyvinylchloride, polyvinylidenechloride and polystyrene to fast yellow color.

The monoazo dyestuffs of the present invention can be expressed by the following general Formula I

[I]
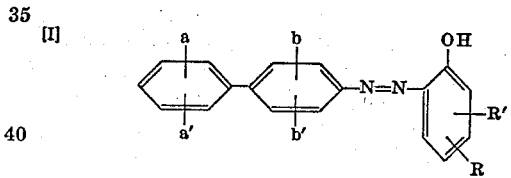

In the above general formula R means alkyl radical having less than 12 carbon atoms, R', a, b, a' and b' mean hydrogen atom, halogen atom or alkyl radical. In other words, they are monoazo dystuffs which are obtained by coupling of aminodiphenyl derivatives (as diazo component) with alkylphenyl derivatives. They are characterized in being made hydrophobic by the increase of aromatic neucleus and simultaneously in being made fatty by the increase of aliphatic radical.

Affinity and fastness will take long stride of improvement by employing this type of dyestuff for shaped articles of polyolefins and the like.

If the results of the fastness test applied to polypropylene fiber are investigated in the following table, it is quite clear that all dystuffs of the present invention show excellent result in all practical points.

TABLE

| | Resistance to Sunlight | Resistance to Washing | Abrasion Resistance | Resistance to Dry Cleaning | Sublimation by Ironing | Sublimation |
|---|---|---|---|---|---|---|
| ![structure 1: biphenyl-N=N-phenol with tC4H9] | Greater than 4 | 4-5 | 4 | 4 | 4 | 4 |
| ![structure 2: biphenyl-N=N-phenol with tC8H17] | do | 4-5 | 4 | 4 | 4 | 4 |
| ![structure 3: biphenyl-N=N-phenol with tC4H9 and CH3] | do | 5 | 4 | 4 | 5 | 5 |
| ![structure 4: biphenyl-N=N-phenol with two tC4H9] | do | 5 | 5 | 4 | 5 | 5 |

For practicing this invention, we can select suitable temperature from room temperature to 100° C. or temperature higher than 100° C. with or without employing swelling agent like carrier or other dyeing assistant.

When the dyestuffs of the present invention are applied to the shaped articles of polyolefins, it is advantageous to use suitable surface active agent and perform dyeing at the medium of water in which the dyestuffs to be used are emulsified or dispersed. Although we can attain satisfactory result at temperature from room temperature to 100° C., it would be better to employ suitable assistant like carrier. In case of resins which have relatively high melting point, we can expect better dyeing result if the high temperature and high pressure are applied. The so-called "thermosol" method applied at suitable condition also affords excellent result.

The dyestuffs of this invention can also be applied to hydrophobic synthetic organic high molecular polymer other than polyolefins e.g. polyvinylchloride, polyvinylidenechloride and polystyrene. The dyeing property and the fastness of the result for these polymers are likewise excellent.

For the purpose of embodiment of the present invention the following examples are shown.

Example 1

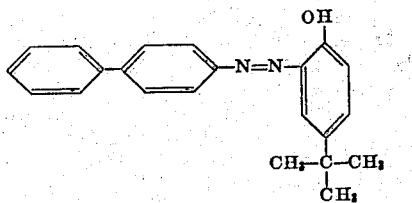

5 g. of the dyestuffs having the above chemical formula and 5 g. of trichlorobenzene are dispersed to become emulsion in 3 l. of aqueous solution containing 6 g. of N-stearoyl-N-methyltaurine. Into this dye bath, 100 g. of polypropylene fiber is transferred and is treated at the temperature of 90°–100° C. for 1.5 hours. Treated substance is then washed three times at a temperature of 70°–80° C. for 30 minutes by the aqueous solution containing 5 g. of N-stearoyl-N-methyltaurine per liter wherein the ratio of dyed substance to solution is 1:30. After washing by hot water, yellow dyed substance is obtained.

Example 2

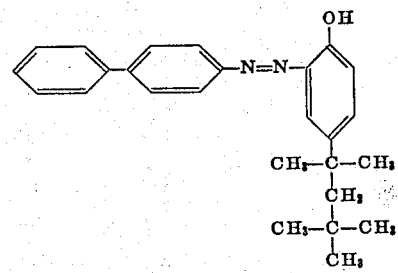

5 g. of the dyestuff having the above chemical formula is dispersed and emulsified in 3 l. of aqueous solution containing 6 g. of N-stearoyl-N-methyltaurine. 100 g. of polypropylene fiber is put into this bath and dyeing is performed under high pressure at the temperature of 120° C for 1.5 hours. Then washing follows as in Example 1 and yellow dyed object is obtained.

Example 3

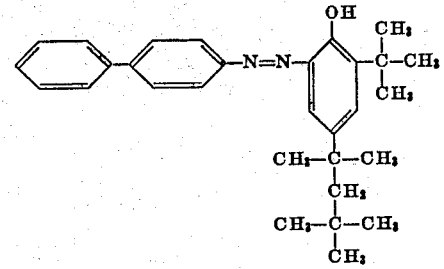

5 g. of the dyestuffs having the above chemical formula is dispersed to become emulsion in 5 l. of aqueous solution containiing 10 g. of N-stearoyl-N-methyltaurine, 100 g. of polypropylene fiber is put into this bath and is dyed under high pressure at the temperature of 125° C. for one hour. After washing as in Example 1 reddish yellow dyed object is obtained.

*Example 4*

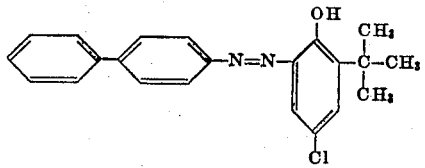

5 g. of the dyestuff having the above chemical formula and 5 g. of trichlorobenzene is dispersed to become emulsion in 3 l. of aqueous solution containing 6 g. of N-stearoyl-N-methyltaurine. 100 g. of polypropylene fiber is transferred in the above dyeing bath and is treated under high pressure at the temperature of 120° C. for 1.5 hours. After washing as in Example 1, yellow dyed object is obtained.

*Example 5*

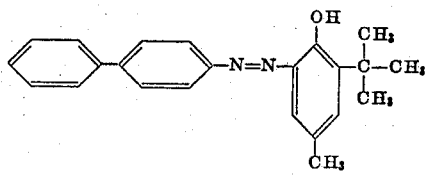

10 g. of the dyestuff having the above chemical formula is dispersed to become emulsion in 3 l. of aqueous solution containing 10 g. of N-stearoyl-N-methyltaurine. Into this solution, 100 g. of polypropylene fiber is put and is treated at the temperature of 90°–100° C. for two hours. After washing as described in Example 1, reddish yellow object is obtained.

*Example 6*

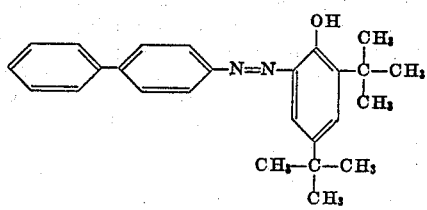

5 g. of the dyestuff having the above chemical formula is dispersed in 5 l. of aqueous solution containing 10 g. of N-stearoyl-N-methyltaurine. Into this solution 100 g. of polypropylene fiber is put and treated at the temperature of 120° C. for two hours. After washing as described in Example 1 reddish yellow object is obtained.

*Example 7*

20 g. of the dyestuff described in the Example 6 is kneaded well with non-ionic surface active agent like alkylbenzene polyethylene oxide, is transferred into 1 l. of the aqueous solution containing 3 g. of N-stearoyl-N-methyltaurine and 2 g. of thickner like sodium alginate and is dispersed to become emulsion. Polypropylene fabric is treated by padding machine in this emulsion. It is squeezed at mangle, dried at 80° C. and heat-treated at the temperature of 125° C. for 5 minutes. After washing as described in Example 1, reddish yellow object is obtained.

*Example 8*

5 g. of the same dyestuff as in Example 4 is dispersed to be emulsion in 3 l. of aqueous solution containing 6 g. of N-stearoyl-N-methyltaurine. Into this solution, 100 g. of polyvinylchloride fiber is transferred and is dyed at the temperature from 60°–70° C. for 1.5 hours. After dyeing it is washed by solution containing 5 g. per liter of stearoyl-N-methyltauriine with the ratio of solution to fiber 30:1, at the temperature from 50° to 60° C. for 30 minutes. After washing by hot water, yellow object is obtained.

*Example 9*

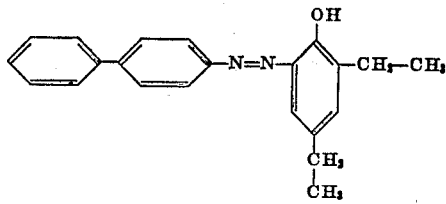

5 g. of the dyestuff having the above chemical formula and 6 g. of diphenyl amine is dispersed in 3 l. of aqueous solution containing 6 g. of N-stearoyl-N-methyltaurine. 100 g. of polyethylene fiber is transferred in the above dyeing bath and dyed at the temperature of 70° C. for 1.5 hours. After dyeing, fiber is subjected to soaping, hot water washing, cold water washing and drying as in Example 8 and yellow dyed object is obtained.

*Example 10*

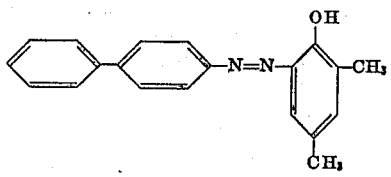

5 g. of the dyestuff having the above chemical formula and 6 g. of trichlorobenzene is dispersed to become emulsion in 3 l. of aqueous solution containing 6 g. of N-stearoyl-N-methyltaurine. 100 g. of polyvinylidenechloride fiber is introduced into this solution and dyed at the temperature of from 60°–70° C. for 1.5 hours. After dyeing, fiber is washed as in Example 8, and yellow dyed object is obtained.

*Example 11*

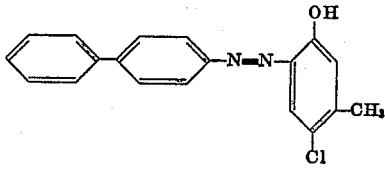

5 g. of the dyestuff having the above chemical formula is dispersed to become emulsion in 5 l. of aqueous solution containing 9 g. of N-stearoyl-N-methyltaurine. Into this dyeing bath, 100 g. of polystyrene fiber is introduced and dyed at the temperature of 100° C. for 1 hour. After dyeing, washing is performed as in Example 8, and yellow dyed object is obtained.

The dyestuffs employed in this invention can be manufactured according to the method shown in the following example.

*Example 12*

17 g. of p-amino diphenyl

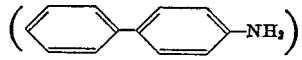

is dissolved in 500 cc. of hot water containing 36 g. of 35 percent hydrochloric acid. While the solution thus prepared is kept at the temperature of 0°–50° C., little amount of aqueous solution (50°–100 cc.) containing 7 g. of sodium nitrate (NaNO₂) is added drop by drop to the above prepared solution for about one hour. The end point of diazotation is confirmed by test paper of potassium iodide starch. Even after addition is over, stirring is continued for about one hour under cooling. After diazotation is over, the solution is filtered and pH of this solution is controlled to 4~5 by sodium acetate.

20 g. of p-t-octyl phenol

is dissolved in as little amount of ethanol as possible (20~30 cc.). pH is controlled to form 8 to 9 by adding several drops of conc. caustic soda solution into the above ethanol solution. While this solution is cooled at the temperature of 0°~50° C., and is stirring the above prepared diazotation solution is added slowly. During this procedure, pH of the reacting solution is kept at 8~9 by caustic soda solution. Even after addition of diazotation solution, stirring under cooling is continued. After confirming the termination of coupling reaction, precipitate is filtered. When this precipitate is washed by dil. hydrochloric acid till it show weak acidity and further washed by water, yellow dyestuff having the following chemical formula is obtained.

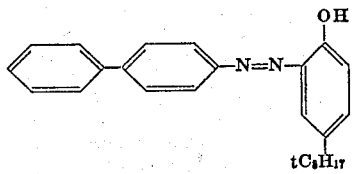

By diazotation of p-amino diphenol and coupling this with other phenol derivatives, we can obtain many kinds of corresponding yellow dyestuffs.

As aforementioned these dyestuffs show excellent dyeing power without defect at all.

What is claimed is:

1. A shaped article consisting of one of the group of polyolefines, polyvinyl chloride, polyvinylidene chloride and polystyrene dyed with at least one monoazodyestuff of the following general formula,

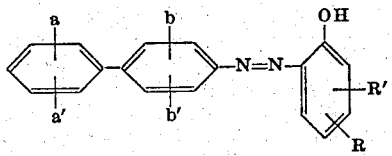

in which R is alkyl radical having less than 12 carbon atoms and R′, a, b, a′, b′, are selected from the group consisting of hydrogen atom, halogen atom and alkyl radical having less than 12 carbon atoms.

2. A method of dyeing of shaped articles consisting of one of the group of polyolefines, polyvinyl chloride, polyvinylidene chloride and polystyrene, which comprises impregnating the articles with at least one monoazo dyestuff of the following general formula,

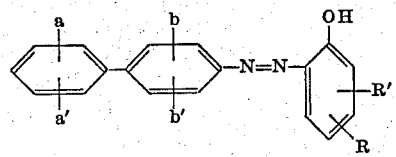

in which R is alkyl radical of carbon atoms being less than 12 and R, a, b, a′, b′ are selected from the group consisting of hydrogen atom, halogen atom and alkyl radical having less than 12 carbon atoms.

3. The article claimed in claim 1 wherein the polymer is selected from the group consisting of polyvinyl chloride, polyvinylidene chloride and polystyrene.

4. A polypropylene shaped article dyed with the dyestuff having the following chemical formula,

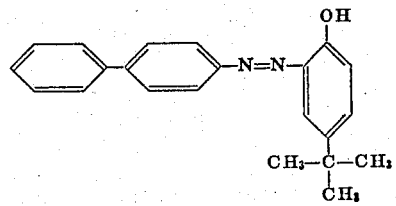

5. A methtod of dyeing polypropylene shaped article which comprises impregnating the articles with the dyestuff having the chemical formula shown in claim 4.

6. A polypropylene shaped article dyed with the dyestuff having the following chemical formula,

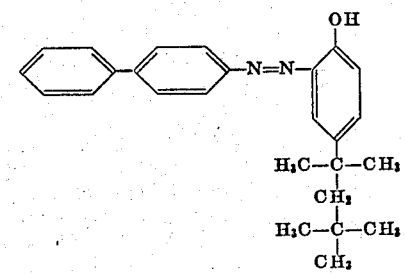

7. A method of dyeing polypropylene shaped articles which comprises impregnating the articles with the dyestuff having the chemical formula shown in claim 6.

8. A polypropylene shaped article dyed with the dyestuff having the following chemical formula,

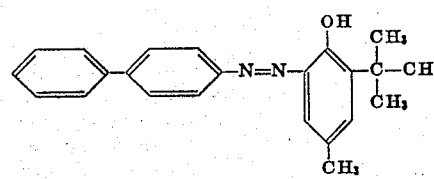

9. A method of dyeing polypropylene shaped articles which comprises impregnating the articles with the dyestuff having the chemical formula shown in claim 8.

References Cited by the Examiner
UNITED STATES PATENTS

| | | | |
|---|---|---|---|
| 2,370,537 | 2/45 | Heywood et al. | 260—206 |
| 2,532,126 | 11/50 | Slifkin et al. | 260—206 X |
| 2,549,922 | 4/51 | Neier et al. | 260—206 |
| 2,898,178 | 8/59 | Kruchkenberg | 8—41 |
| 2,944,871 | 7/60 | Atkinson et al. | 8—41 |
| 2,989,358 | 6/61 | Jurgeleit | 8—41 |

NORMAN G. TORCHIN, *Primary Examiner.*